United States Patent
Wilson et al.

(10) Patent No.: US 7,334,117 B2
(45) Date of Patent: Feb. 19, 2008

(54) DEVICE BOOT LOADER FOR PROCESSING ONE OR MORE REQUESTS FROM A HOST COMPUTER SYSTEM CONCURRENTLY WITH LOADING OR UPDATING THE FIRMWARE OF THE DEVICE

(75) Inventors: Daniel B. Wilson, Austin, TX (US); Craig A. Aiken, Austin, TX (US)

(73) Assignee: National Instruments Corporation, Austin, TX (US)

(*) Notice: Subject to any disclaimer, the term of this patent is extended or adjusted under 35 U.S.C. 154(b) by 548 days.

(21) Appl. No.: 10/911,094

(22) Filed: Aug. 4, 2004

(65) Prior Publication Data
US 2006/0031664 A1    Feb. 9, 2006

(51) Int. Cl.
*G06F 9/00* (2006.01)

(52) U.S. Cl. .............................. 713/1; 713/2
(58) Field of Classification Search ............. 713/1–100
See application file for complete search history.

(56) References Cited

U.S. PATENT DOCUMENTS

| | | | |
|---|---|---|---|
| 5,379,431 A | 1/1995 | Lemon et al. | |
| 5,887,164 A | 3/1999 | Gupta | |
| 6,763,458 B1 | 7/2004 | Watanabe et al. | |
| 6,795,872 B2 | 9/2004 | Page et al. | |
| 6,834,384 B2 | 12/2004 | Fiorella, III et al. | |
| 6,862,641 B1 | 3/2005 | Strongin et al. | |
| 6,996,635 B2* | 2/2006 | Goodman et al. | 710/5 |
| 7,086,049 B2* | 8/2006 | Goodman | 717/168 |
| 2003/0005212 A1 | 1/2003 | Cocca | |
| 2004/0103347 A1* | 5/2004 | Sneed et al. | 714/32 |
| 2005/0160217 A1* | 7/2005 | Gonzalez et al. | 711/6 |

OTHER PUBLICATIONS

"GNU GRUB," http://www.gnu.org/software/grub Dec. 20, 2004 (2 Pages).

* cited by examiner

*Primary Examiner*—Rehana Perveen
*Assistant Examiner*—Paul Yanchus, III
(74) *Attorney, Agent, or Firm*—Meyertons Hood Kivlin Kowert & Goetzel, P.C.; Jeffrey C. Hood

(57) ABSTRACT

System and method for loading and/or updating firmware in a device, e.g., an embedded device, operable to be coupled to a host computer system. A first portion of firmware of the device, e.g., a boot loader, may be executable to operate the device, including processing requests from the host computer system and/or enabling the device to execute a second portion of the firmware, e.g., an operating system for the device. The device may be coupled to other devices or instruments. The second portion of the firmware may allow the host computer system to operate and/or control the other devices or instruments through the device. The host computer system may transmit a different version of the second portion of the firmware to the device, e.g., enabling the device to couple to and operate with a specific instrument. The host computer system may not update the first portion of the firmware.

43 Claims, 13 Drawing Sheets

Computer System 82

Computer System 82

DEVICE BOOT LOADER FOR PROCESSING ONE OR MORE REQUESTS FROM A HOST COMPUTER SYSTEM CONCURRENTLY WITH LOADING OR UPDATING THE FIRMWARE OF THE DEVICE

BACKGROUND

1. Field of the Invention

The present invention relates to the field of embedded systems, and more particularly to a system and method for loading and updating firmware on an embedded device.

2. Description of the Related Art

Many types of devices include non-volatile memory which stores program instructions that are executed after power is applied or upon reset. These program instructions typically perform various initialization functions and then initiate loading and execution of other software such as operating system software. Typically, the initialization program instructions are referred to as "firmware" and were, in the past, stored in either ROM (read-only memory) or EPROM (electrically programmable read-only memory). However, using ROM or EPROM devices to store the firmware had several drawbacks. One such drawback was that to install new or different versions of firmware, there was the need for physical replacement of a ROM device or manipulation such as irradiating an EPROM device with ultraviolet light and then using an EPROM programmer to store new firmware on the EPROM device.

When electrically erasable programmable read only memory (EEPROM) devices became available years ago, EEPROM devices were often used instead of ROM or EPROM devices to store firmware because of the drawbacks discussed above. New firmware could be installed without the need for physical replacement or manipulation. At first, there were some drawbacks to using EEPROMs. One such drawback was that the entire storage of an EEPROM had to be rewritten to update the firmware. In other words, a portion of the EEPROM could not be written to specifically. This left the firmware updating procedure vulnerable to power failures or other errors (e.g., software bugs) in the firmware itself. If the firmware had an error, it could render the device or computer system non-operational. Often, a physical replacement of the EEPROM device was required if an error occurred in the firmware.

Currently, versions of EEPROMs are available where it is possible to update a portion of the EEPROM without updating the entire EEPROM. This type of EEPROM can be found in flash memory cards for digital cameras, among other devices, and is also used to store firmware for devices and computer systems.

However, even with individually updatable portions of EEPROMs, often, especially in embedded devices, in updating firmware on the device, the entire firmware is replaced. Thus, prior art methods for updating firmware in non-volatile memory, such as EEPROMs, may still include the drawbacks related to errors in the firmware as noted above, e.g., power failures, software bugs, etc., interrupting the upgrade process, and thus rendering the device inoperable, and so a physical replacement of the EEPROM may be required.

In some networked systems, such as Universal Serial Bus (USB) based systems, devices on the network are uniquely identified to a host device via a process referred to as enumeration, whereby the host device determines the capabilities of the devices and appropriate drivers for the devices. Generally, a device on the network is enumerated upon power-up, upon coupling to the network, and upon reset of the device. In many systems, the enumeration may take a substantial amount of time to perform.

In prior art systems, whenever firmware is updated, a re-enumeration of the device is generally required, and the enumeration is generally not performable until the firmware update process is complete. In other words, prior art firmware and firmware updating techniques do not facilitate enumerating the device concurrently with performing other functions. For example, when the device is an embedded device, the enumeration functionality is included in the firmware. If the firmware is updated, the firmware is executed again, and so the enumeration functionality is generally executed again. Such re-enumerating of the device requires additional time, which may not be desired and/or within a tolerance of time transpiring in the system of computers and/or other devices.

Thus, there is a need for a robust system and method that overcomes various current limitations of updating or replacing firmware on a device.

SUMMARY OF THE INVENTION

Various embodiments of a system and method for loading and/or updating firmware on a device are presented. In various embodiments, a device may be coupled to a host computer system. The device may be coupled to the host computer system by Universal Serial Bus, FireWire (IEEE 1394), GPIB (general purpose interface bus), Ethernet, or wireless link, among others. A first portion of firmware of the device may implement various functionalities for operating the device. These functionalities may include performing a transfer of a second portion of firmware from a first memory (e.g., non-volatile memory) of the device to a second memory of the device and processing one or more requests from the host computer system. The first portion of the firmware may be considered a boot loader of the device, and the second portion of the firmware may be considered an operating system of the device. It should be noted that the boot loader described herein includes functionality not included in prior art boot loaders, and thus may be considered an "extended" bootloader, although for brevity the term "boot loader" will be used throughout this application to refer to various embodiments thereof, including embodiments where additional program instructions are stored with and operate in conjunction with a conventional (i.e., prior art) boot loader program.

Transferring the operating system and processing requests from the host computer system may be performed concurrently. For example, the operating system may be transferred while the boot loader allows the device to concurrently perform an enumeration or association process with the host computer system. In one embodiment, the device may process a request from the host computer system. For example, the device may process a request for a version of the operating system, a status of the operating system (e.g., is the operating system currently operationally, etc.), and/or a type of instrument coupled to the device, among others.

The device may be coupled to other devices or instruments. For example, in various embodiments, the device may be coupled to: a GPIB instrument, signal conditioning circuitry, a VXI instrument, a PXI (PCI extensions for instrumentation) instrument, a video device or camera, and/or a motion control device, among other types of devices. The operating system may allow the host computer system to operate and/or control one or more of these other devices or instruments through the device. In other words, the device may operate as a bridge between the host computer system and the other devices or instruments. The other devices or instruments may be coupled to a unit under test, coupled to receive signals which are typically generated by one or more transducers (i.e. sensors), and/or coupled to one or more actuators for controlling a device or process.

In various embodiments, the host computer system may request a version of the operating system currently installed on the device. In response, the device may transmit information associated with or indicating the version of the operating system or firmware. The host computer system may determine if the operating system should be updated, based on the transmitted information. In some instances, the host computer system may transmit a different operating system, e.g., different from the operating system stored on the device, to the device. The device may receive and store the different operating system in the first memory and then transfer the different operating system from the first memory to the second memory where the different operating system may be executed.

The different operating system may be an updated or later version of the operating system, an earlier version of the operating system, or simply a different version of the operating system, i.e., the different operating system may allow the device to be operable to be coupled to a specific instrument or other device.

BRIEF DESCRIPTION OF THE DRAWINGS

A better understanding of the present invention can be obtained when the following detailed description of the preferred embodiment is considered in conjunction with the following drawings, in which.

Figure 1A:
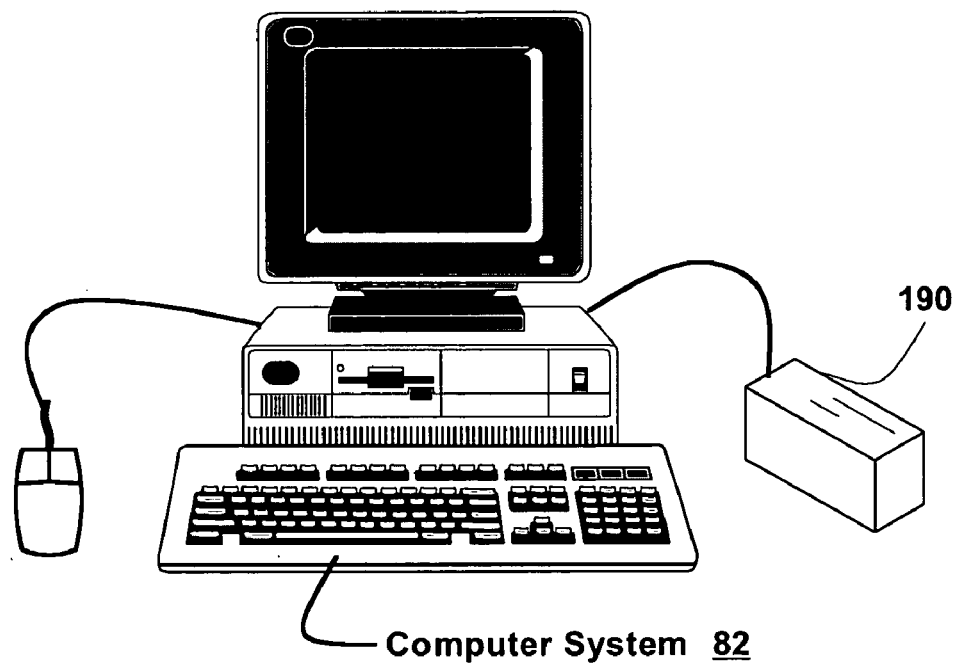
FIG. 1A illustrates a computer system coupled to a device in a wired fashion, according to various embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 6,681,284 titled "System and Method For Providing a Serial Bus Interface Using Distributed Driver Execution," filed Nov. 27, 2000.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a nonvolatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Firmware—the term "firmware" includes any type of program instructions, code, script and/or data, or combinations thereof, stored and/or intended for storage in a non-volatile memory (e.g., on an EPROM, EEPROM, etc.). The term may also refer to the stored instructions or data in combination with the hardware on which it is stored.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Figure 1B:
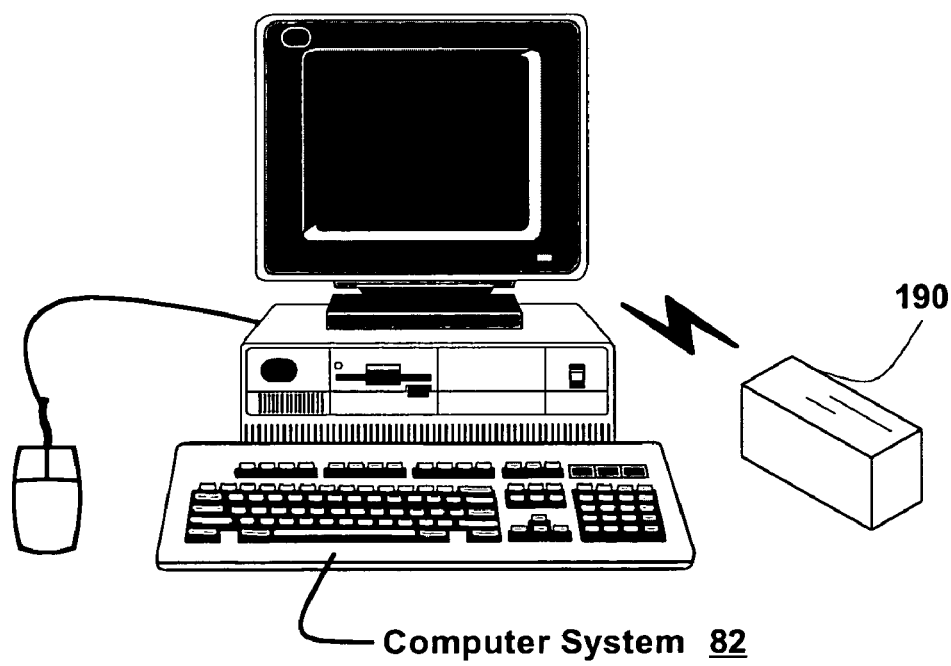
FIG. 1B illustrates a computer system coupled to a device in a wireless fashion, according to various embodiments.

FIGS. 1A and 1B—A Computer System Coupled to a Device

FIGS. 1A and 1B illustrate embodiments of a computer system 82 coupled to a device 190 by various means. FIG. 1A illustrates the computer system 82 coupled to device 190 in a wired fashion, according to various embodiments. FIG. 1B illustrates computer system 82 coupled to device 190 in a wireless fashion, according to various embodiments.

In various embodiments, the computer system 82 may include a memory medium(s) which may store one or more computer programs or software components. For example, the memory medium may store one or more software programs which are executable to perform various methods described herein. Various embodiments further include receiving or storing instructions and/or data implemented in accordance with the foregoing description upon a carrier medium.

Device 190 may include firmware (e.g., program instructions stored or intended for storage in a non-volatile memory, e.g., on an EEPROM) that is executable by device 190 to perform various functionalities and/or various methods described herein.

In some embodiments, device 190 may be an embedded device. Embedded devices may be considered special-purpose devices or computer systems, and embedded devices typically meet very different requirements from those of general-purpose computer systems. For example, embedded devices may be used in automatic teller machines, cellular telephones, computer networks (including network switches, routers, and/or firewalls), microwave ovens, point of sale terminals, MP3 players, modems, fax machines, document printers, computer system controller cards (e.g., a video host controller, an integrated drive electronics or IDE host controller, a Universal Serial Bus or USB host controller, a local area network or LAN host adapter, a wireless local area network or WLAN host adapter, an audio adapter, etc.), a PCMCIA (Personal Computer Memory Card International Association) adapter, and/or personal digital assistants (PDAs), among others. An embedded device may be used as part of a larger system. In many instances of embedded devices, typical input and output devices such as a keyboard, mouse, and/or monitor may not be present.

Figure 2A:
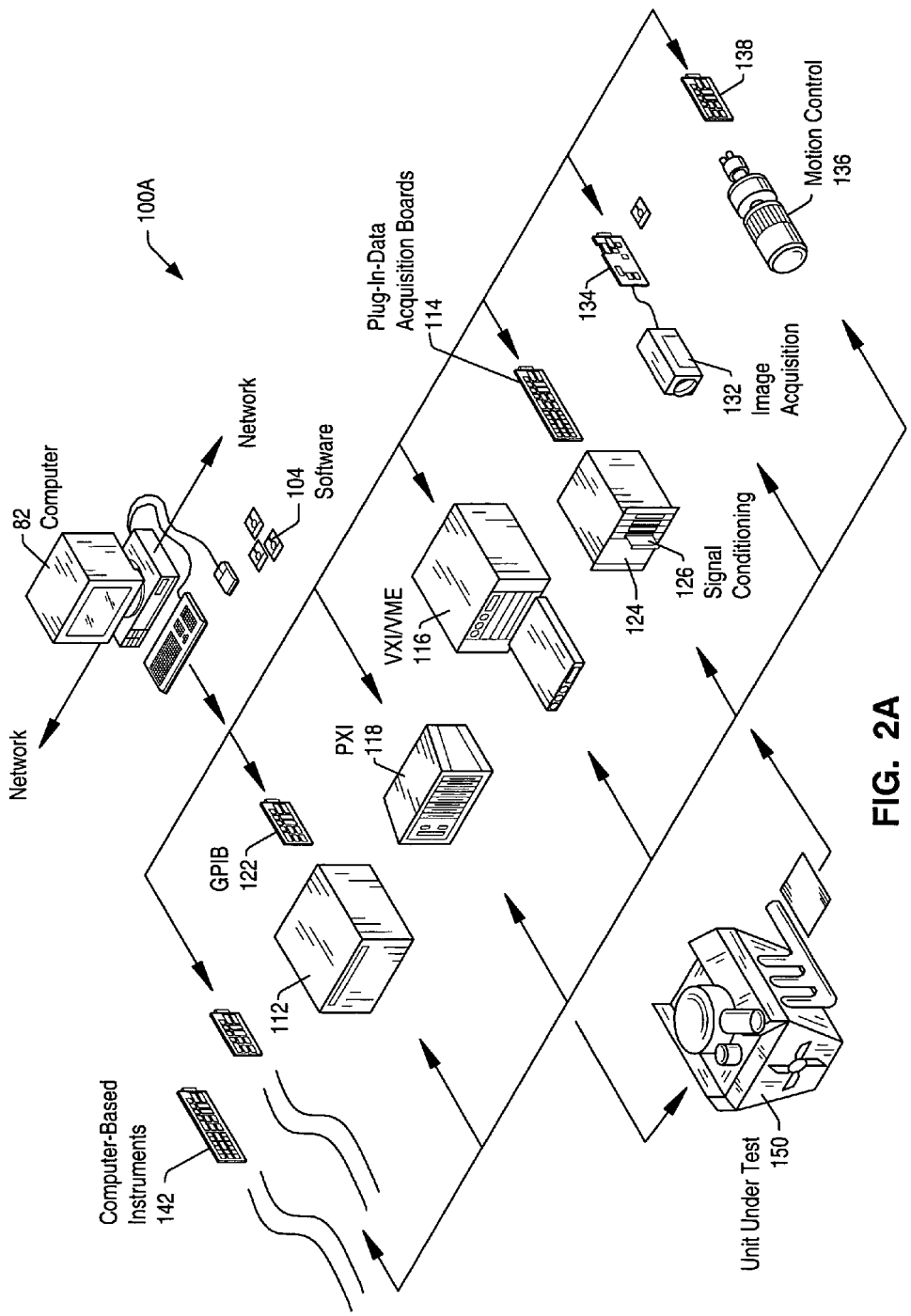
FIG. 2A illustrates an instrumentation control system, according to various embodiments.
Figure 2B:
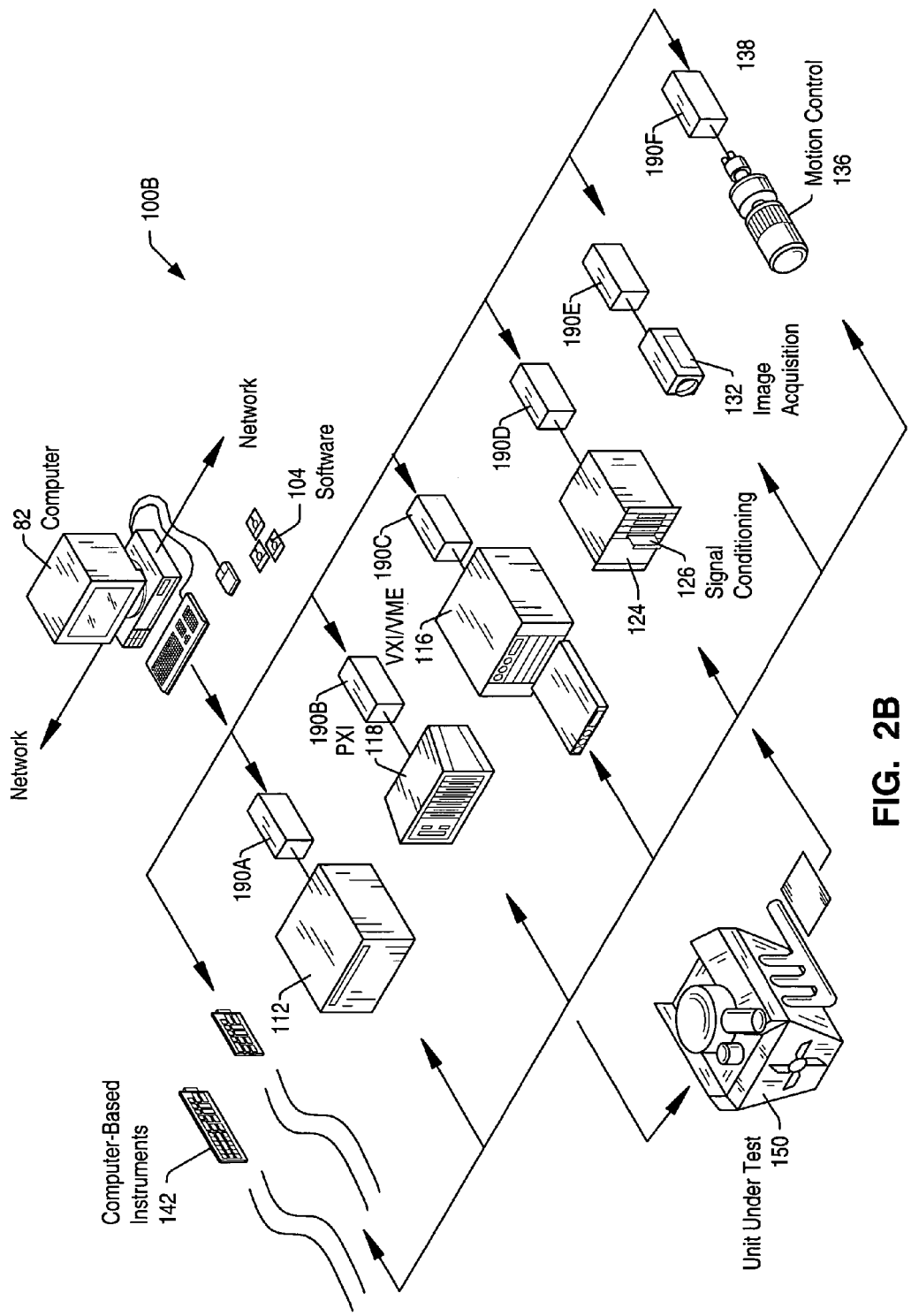
FIG. 2B illustrates an instrumentation control system, according to various embodiments.

FIGS. 2A and 2B—Instrumentation System

FIG. 2A illustrates an exemplary instrumentation system 100A which may implement various embodiments. System 100A may include a host computer system 82 which connects to one or more instruments. The host computer system 82 may include a CPU, a display screen, memory, and one or more input devices such as a mouse or keyboard as shown. Computer system 82 may operate with the one or more instruments to analyze, measure or control a unit under test (UUT) or process 150. Computer system 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. Computer system 82 may couple to and operate with one or more of these instruments. The instruments may be coupled to a unit under test (UUT) or process 150, or may be coupled to receive field signals, typically generated by one or more transducers. System 100A may be used in a data acquisition and control application, in a test and measurement application, an image processing or machine vision application, a process control application, a man-machine interface application, a simulation application, or a hardware-in-the-loop validation application, among others. In the exemplary embodiments shown in FIG. 2A, the functionality of device 190 may be included in one or more of the instruments (e.g., 112, 118, 116, 124 132, 136), in one or more expansion cards comprised in the instruments (e.g., 126), and/or in one or more expansion cards comprised (e.g., 122, 114, 134, 138, 142) in the host computer 82.

FIG. 2B illustrates an exemplary instrumentation system 100B which may implement various embodiments. System 100B may include computer system 82 (e.g., host computer system) which connects to one or more devices 190A-190F which in turn connect to one or more instruments. More specifically, computer system 82 may be coupled to the one or more devices 190A-190F which may in turn be respectively coupled to a GPIB instrument 112, a PXI instrument 118, a VXI instrument 116, signal conditioning circuitry 124, a video device or camera 132, and a motion control device 136, among other types of devices, where devices 190A-190F represent respective embodiments of the general or generic device 190. In other words, device 190 may refer collectively to various embodiments of the device, including those in which the device functionality is included in another device, such as the instruments of FIG. 2A, or to any such device in general.

Note that in contrast with the system 100A of FIG. 2A, where the functionality of embodiments of the present invention is comprised in the instruments and/or the computer system, e.g., in expansion cards comprised therein, in the example system of FIG. 2B, the functionality is provided by devices 190A-190F.

Computer system 82 may operate with the one or more instruments coupled to devices 190A-F to analyze, measure or control a UUT or process 150. For example, computer system 82 may operate with the one or more devices coupled to devices 190A-F to a process or device 150 to perform an automation function, such as MMI (Man Machine Interface), SCADA (Supervisory Control and Data Acquisition), portable or distributed data acquisition, process control, advanced analysis, or other control. For example, device 190C may be an embedded device and may be coupled to computer system 82 by a Universal Serial Bus (USB) connection. As above, device 190C may be coupled to GPIB instrument 112 through a GPIB (IEEE 488) connection. In some embodiments, device 190 (e.g., device 190C) may be used as a bridge from one type of connection to another.

FIG. 3—Device

Figure 3:
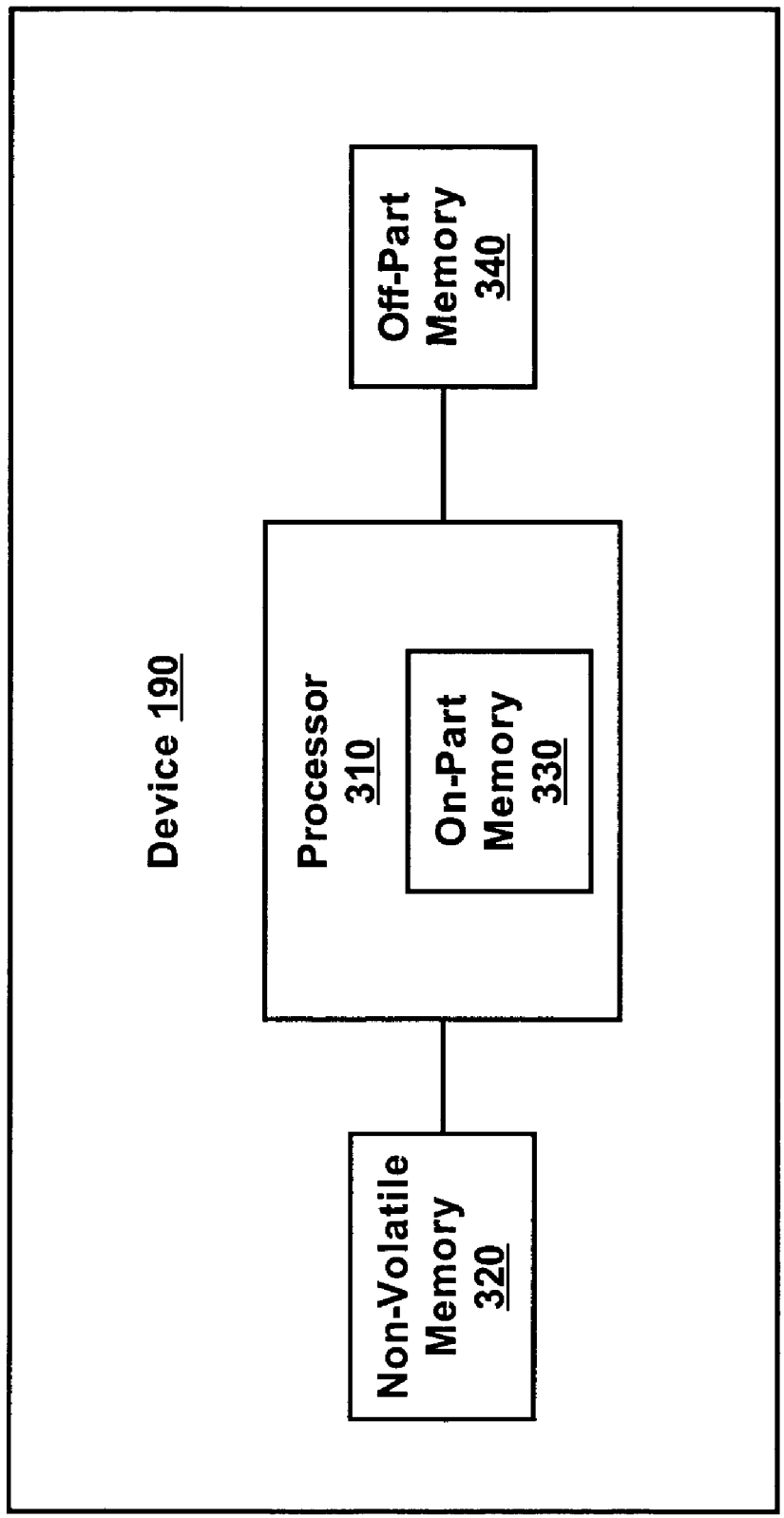
FIG. 3 is a block diagram representing various embodiments of a device.

FIG. 3 is a block diagram representing various embodiments of device 190. Device 190 may include at least one processor 310. The processor (e.g., a microprocessor or microcontroller) 310 may be any of various types used in various devices or computer systems, such as a Cypress EZ-USB FX 2, among others. Non-volatile memory 320 may be coupled to processor 310, and non-volatile memory 320 may store firmware (e.g., a boot loader and an operating system, according to various embodiments) which is executable by processor 310. Firmware may include a plurality of program instructions which may allow a device to function as desired. The non-volatile memory 320 may also store other software and/or information for operation of device 190 as desired.

In some embodiments, processor 310 may include a memory on the same integrated circuit (IC) device or chip, referred to as "on-part memory" 330. For instance, on-part memory 330 may store program instructions executable by processor 310.

In some embodiments, processor 310 may be coupled to a memory which is not on the same IC device or chip as processor 310, referred to as "off-part memory" 340. For example, off-part memory 340 may store program instructions executable by processor 310.

Thus, various portions of the firmware, e.g., the boot loader and OS, may be stored in and/or executed from non-volatile memory 320, on-part memory 330, and/or off-part memory 340 or various combinations of memories 320, 330, and/or 340. In some embodiments, a first memory of device 190 may include non-volatile memory 320, and a second memory of device 190 may include on-part memory 330 and/or off-part memory 340. As will be described in more detail below, in preferred embodiments, the firmware may be stored in non-volatile memory, then transferred or copied to on-part memory 330 and/or off-part memory 340 for execution by the processor 310.

Figure 4:
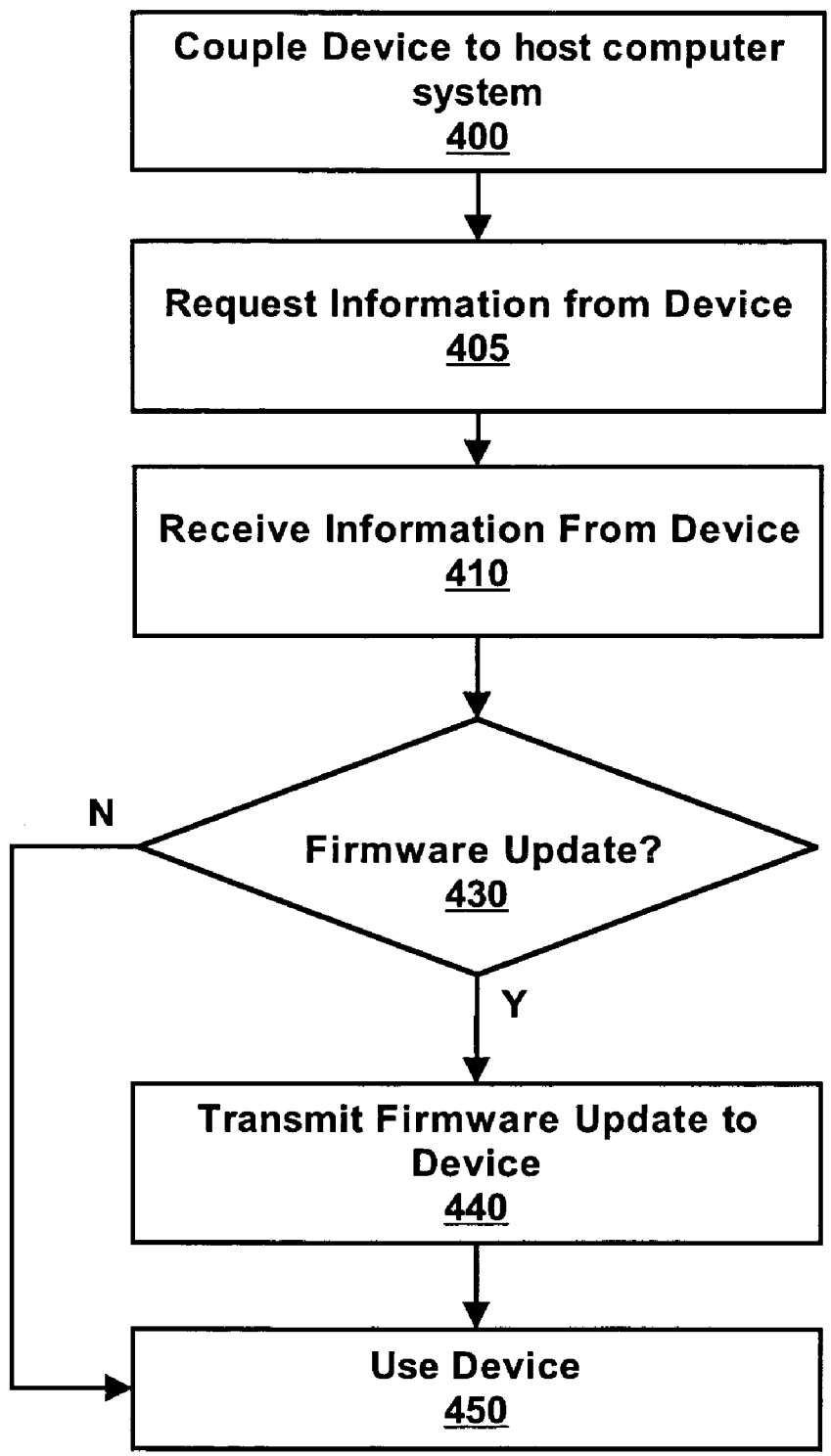
FIG. 4 is a flowchart diagram illustrating a method which may be used to operate a device, according to various embodiments.

FIG. 4—Host Computer System Device Operation

FIG. 4 is a flowchart diagram of a method for operating device 190 and host computer system 82, according to various embodiments. It is noted that in various embodiments one or more of the method elements may be performed concurrently, in a different order, or may be omitted. Additional method elements may be performed as desired.

Figure 5:
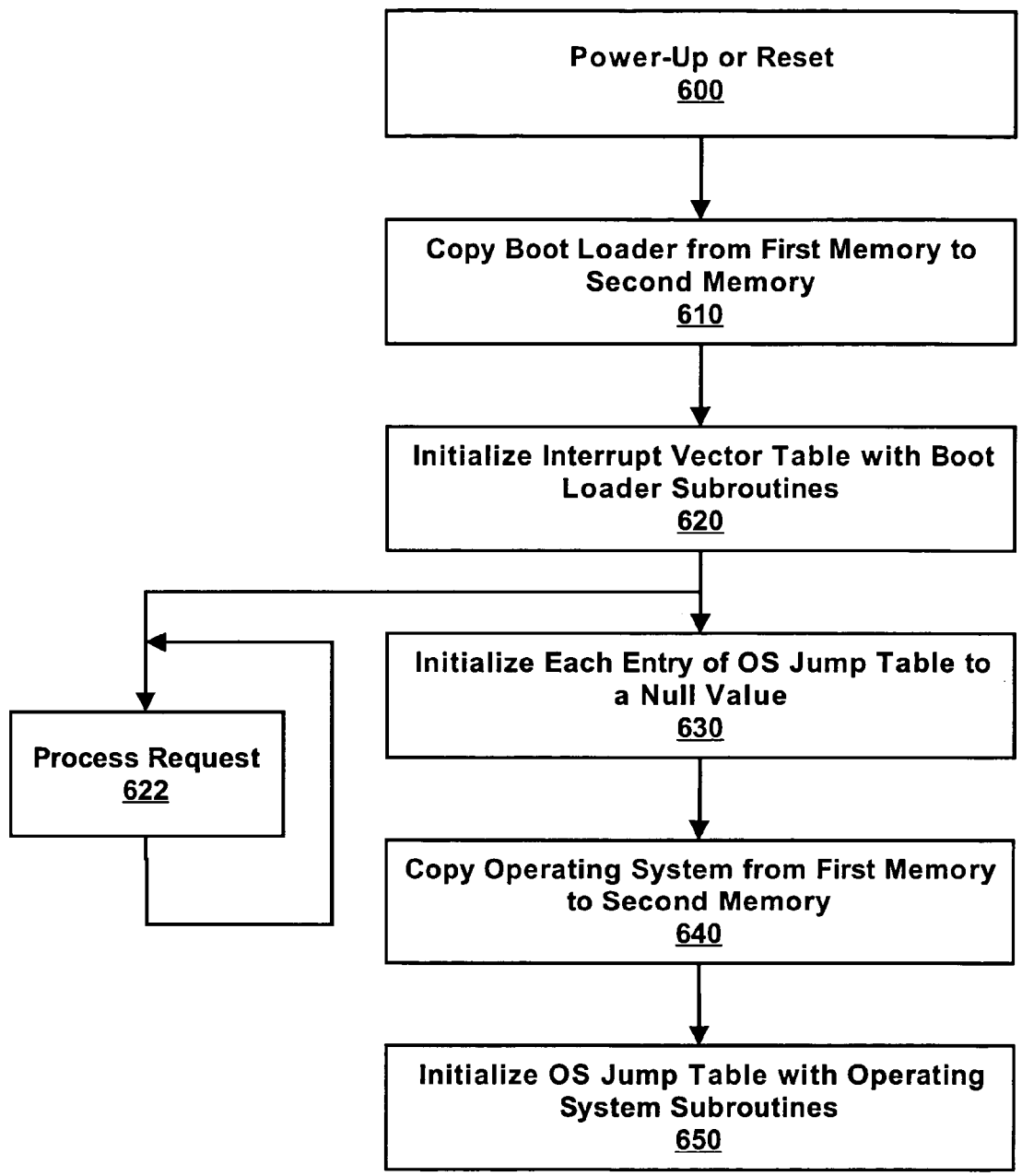
FIG. 5 is a flowchart diagram illustrating a method which may be used to operate a device, according to various embodiments.

As indicated at 400, device 190 may be coupled to the host computer system. In some embodiments, after device 190 is coupled to the host computer system, device 190 may execute an initialization and/or reset method such as a method as illustrated in FIG. 5. In various embodiments, the host computer system may request and/or receive information from device 190 while device 190 is executing the initialization and/or reset method.

At 405, the host computer system may request information from device 190. For example, the host computer system may request version information on firmware stored on device 190 (e.g., the version of the operating system currently stored on the device, as well as any other type of information which may be useful for operating or communicating with the device, as desired).

At 410, the host computer system may receive information from device 190. In some embodiments, the information may include data indicating the version of the firmware stored in device 190. For example, the data indicating the version of firmware may include one or more numbers and/or characters (e.g., ASCII and/or Unicode characters) in a form of a string. For example, the firmware version may include a format of "[Major Revision].[Minor Revision].[Bug Fix Revision].[Build Number Revision]", such as, for example "02.07.01.0003". The data indicating the version of the firmware may indicate what type of device (e.g., GPIB device 112, VXI 116, motion controller 136, etc.) may be coupled to device 190. For example, if device 190 is configured to be coupled to GPIB device 112, the firmware version may include a format of "GPIB 02.07.01.0003". A device descriptor (e.g., a USB device descriptor and/or identification) received from device 190 may indicate what type of device may be coupled to device 190. The information received from device 190 may be used to determine if the firmware or a portion of the firmware should be updated.

In some embodiments, the information may include data indicating a status of a portion of the firmware. As one example, the data may indicate that the portion of the firmware is not loaded. In one instance, the data of the version may be one or more bytes where each bit is set to zero. In a second instance, the firmware version may be represented by "00.00.00.0000" if a portion of the firmware is not loaded, such as the operating system portion of the firmware. As a second example, the data may indicate that the portion of the firmware has failed to load. In one instance, the data of the version indicating a failure may be one or more bytes where each bit is set to one. In a second instance, the data of the version indicating a failure may include "FF.FF.FF.FFFF". It is noted that the examples provided are meant to be exemplary only and are not meant to limit any embodiments to any particular content(s) or format(s).

The information may include data indicating a serial number of device 190. For example, the serial number may be stored in a first portion of the firmware or a boot loader. The serial number may only be set or updated by a manufacturer of device 190. In one embodiment, the serial number may be used to identify device 190. For example, the serial number may be unique among other serial numbers of other devices 190.

In some embodiments, the information may include data associated with an enumeration process. The enumeration process may uniquely identify device 190. For example, the data associated with the enumeration process may include one or more of: a vendor identification (ID), a product ID, a network ID, and/or a device release number, among others. One or more data structures stored within the host computer system may include the data associated with the enumeration process. In various embodiments, device 190 may be coupled to the host computer system by USB, and the enumeration process may include various information and/or processes associated with enumeration by USB. In some embodiments, the host computer system requesting information and device 190 transmitting information to the host computer system may be considered an association process. An enumeration process may be included in an association process.

At 430, the host computer system may determine if the firmware or a portion of the firmware requires an update based upon the information received from device 190 in 410. It may be determined that the firmware or a portion of the firmware does not need to be updated. If the firmware or a portion of the firmware does not need to be updated, the method may proceed to 450, as described below.

Alternatively, it may be determined that the firmware or a portion of the firmware should be updated. In one example, the information received may indicate that the firmware is operable to allow device 190 to be coupled to a serial device such as serial instrument 182 where it may be desired to have device 190 coupled to GPIB device 112. In a second example, it may be determined that a previous (e.g., earlier) or later version of the firmware should be used on device 190. For instance, the host computer system may determine that the firmware or a portion of the firmware should be updated to a later version (e.g., update from version 02.07.01.0003 to version 02.08.00.0001, etc.). The host computer system may update the firmware or a portion of the firmware at 440. In other words, updating the firmware may include providing a different version, e.g., a later or earlier version, of the firmware or a portion of the firmware, and/or updating the firmware may include providing different firmware or a portion of the firmware, e.g., to enable device 190 to operate with a different instrument or device.

In some embodiments, the operating system portion (e.g., second portion) of the firmware may be updated while the boot loader portion (e.g., first portion) of the firmware is not updated. For instance, as mentioned above, device 190 may initially be coupled to serial instrument 182. Device 190 may then be de-coupled from the serial instrument 182 and coupled to GPIB device 112, and a portion of the firmware, such as an operating system, may be updated to allow the host computer system to communicate with GPIB device 112 through device 190.

After the firmware or a portion of the firmware has been updated, the device may be used, as indicated at 450. In some embodiments, device 190 may not need to be power-cycled or de-coupled from the host computer system to be operable to interact with various and/or different devices after the firmware has been updated (e.g., the operating system portion of the firmware). In preferred embodiments, an enumeration process or one or more portions of the enumeration process may not need to be performed after the firmware has been updated if device 190 has already enumerated with the host computer system. In other words, updating the firmware may not require re-enumeration of the device.

In various embodiments, updating a portion of the firmware, such as the operating system portion, may allow device 190 to be operably robust. For example, device 190 may become uncoupled from the host computer system or lose power during a firmware update. When device 190 is re-coupled to the host computer system, device 190 may communicate with the host computer system and perform various functions, including updating the operating system, because the boot loader was not updated or changed.

Figure 6:
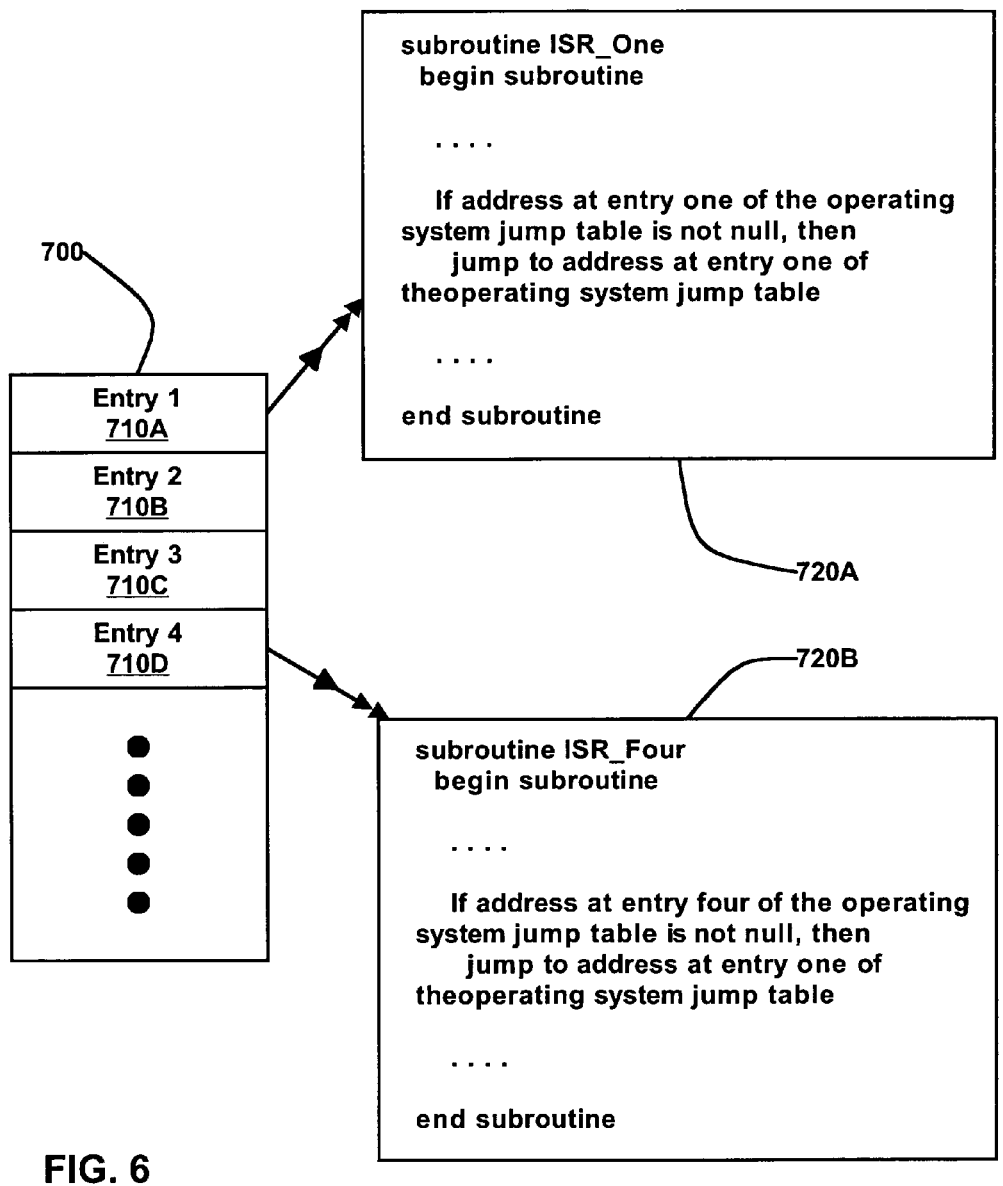
FIG. 6 is a block diagram representing a data structure and subroutines stored in a memory, according to various embodiments.
Figure 7:
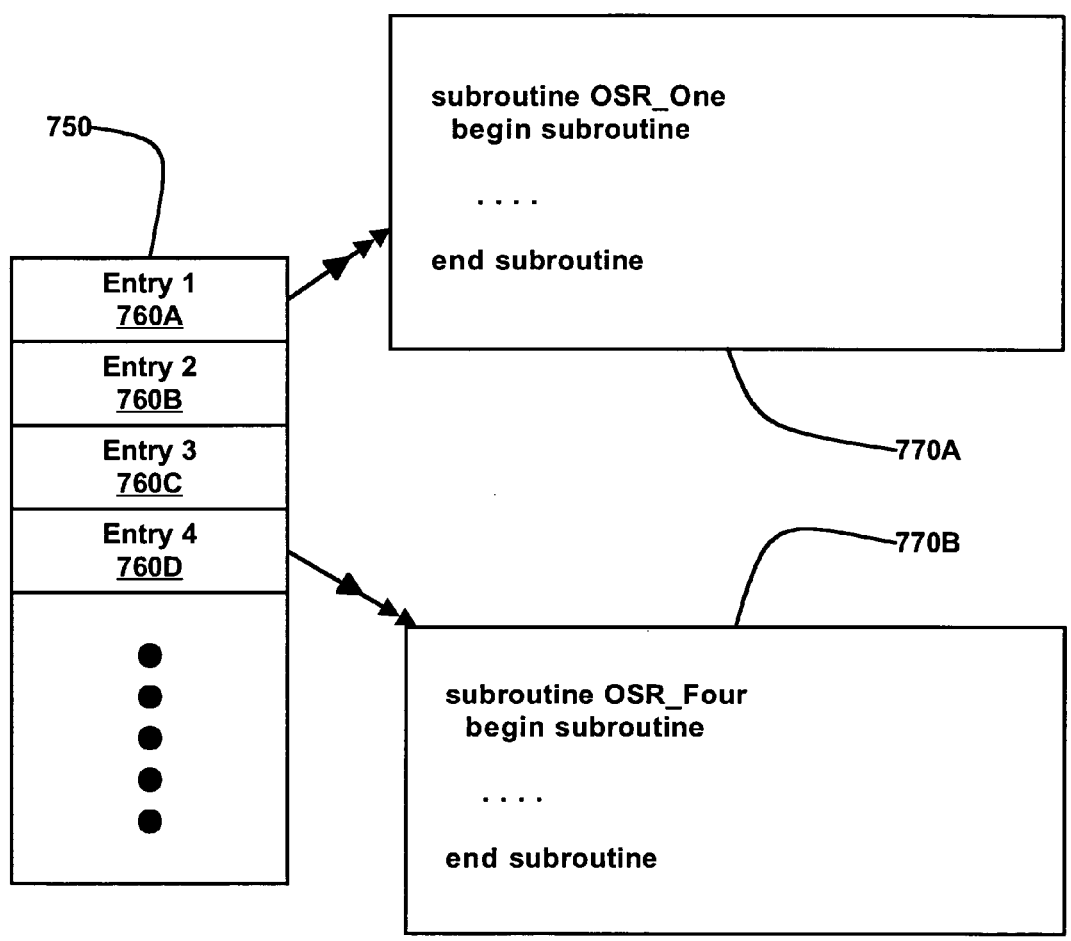
FIG. 7 is a block diagram representing a data structure and subroutines stored in a memory, according to various embodiments.

FIGS. 5-7—Device Initialization

FIG. 5 illustrates a flowchart diagram of an initialization method for device 190, according to various embodiments. As discussed above, software or firmware may be stored in first memory (e.g., non-volatile memory 320) of device 190. It is noted that in various embodiments one or more of the method elements may be performed concurrently, in a different order, or may be omitted. Additional elements may be performed as desired.

As indicated at 600, device 190 may have power initially applied or be subjected to a reset. For example, a reset may occur upon connection to a network, e.g., to the host computer system 82. The device 190 preferably has a boot loader and an OS stored in non-volatile memory 320, e.g., first memory.

At 610, the boot loader may be copied from the first memory (e.g., non-volatile memory 320) to second memory (e.g., including on-part memory 330). In some embodiments, the boot loader may include a format (e.g., a byte-ordering format or signature format) which allows ROM instructions executable by processor 310 to initialize entries of an interrupt vector table, such as entries 710A-710D of interrupt vector table 700, as illustrated in FIG. 6, with memory addresses of one or more portions of the boot loader, as shown at 620.

For instance, the one or more portions of the boot loader may each be a subroutine, and each subroutine may be considered an interrupt service routine (ISR). In one example, after the boot loader is copied to second memory, one or more interrupt service routines (ISRs) of the boot loader may be placed at specific addresses in memory. In a second example, processor 310 may determine one or more memory addresses of one or more ISRs and initialize interrupt vector table 700 based on the format of the stored boot loader. For instance, entries 710A and 710D may be initialized to store addresses of subroutines or ISRs 720A and 720B, respectively. Entries 710B-710C may be initialized to store null values.

In some embodiments, interrupts, such as ISRs 720A-720D, may be enabled and/or disabled by a bit-mask (e.g., a bit-mask accessible by processor 310). For example, the bit-mask may include a format of "1001" which may indicate that ISR 720A is available, ISRs 720B-720C are not available, and ISR 720D is available. The bit-mask may include any number of bits and/or may be stored in a register accessible processor 310.

After 620, device 190 executes the boot loader, and, as indicated at 622, one or more requests may be processed concurrently with other operations, such as steps 630-650. In one example, a request to update the firmware may be processed (see FIG. 10) at 622. In a second example, a request to enumerate the device may be processed. In a third example, a request for a version of the operating system may be processed. Various other requests may be processed by device 190 with other and/or additional program instructions.

At 630, an operating system (OS) jump table 750, one embodiment of which is illustrated in FIG. 7, may be initialized. Further details regarding the OS jump table are discussed below with regards to FIGS. 7-8. In some embodiments, entries 760A-760D of OS jump table 750 may each be initialized to store a null value. In various embodiments, after the entries of interrupt vector table 700 and the entries of the OS jump table 750 are initialized, device 190 may be operable to receive and/or respond to requests from the host computer system. For example, when device 190 receives information from the host computer system, an interrupt may be generated in response to receiving the information. In response to the interrupt, an appropriate interrupt index number (e.g., an interrupt number four) may be determined. An address in memory from the interrupt vector table may be determined based on the interrupt index number. For instance, if the interrupt index number is four, the fourth entry, such as entry 710D, of interrupt vector table 700 may store an address of a corresponding ISR. In some embodiments, if an entry of the interrupt vector table stores an address in memory, then processor 310 may execute one or more program instructions starting at the address in memory stored by the entry of interrupt vector table 700.

In some embodiments, if an entry of interrupt vector table 700 stores a null value, the interrupt associated with the interrupt index number corresponding to the entry may be ignored. For example, an interrupt index number of two may be generated, and the second entry, such as entry 710B, of interrupt vector table 700 may store a null value; the interrupt corresponding to interrupt index two may be ignored.

In various embodiments, if a bit in the bit-mask stores a null or zero value, the interrupt associated with the interrupt index number corresponding to the entry may be ignored. An interrupt index number of two may be generated, and the second bit in the bit-mask may store a null or zero value which may indicate or cause the interrupt corresponding to interrupt index two to be ignored.

In some embodiments, each ISR 720 may include program instructions operable to access OS jump table 750 and determine if an entry 760 either stores a memory address or a null value. For example, an interrupt associated with an interrupt index of four may be generated, and an address in memory may be determined from entry 710D, as discussed above. An ISR, such as ISR 720B starting at the memory address stored by entry 710D, may be executed. ISR 720B may include one or more program instructions to access an entry 760 of OS jump table 750. For instance, ISR 720B may access entry 760D of OS jump table 750. ISR 720B may determine whether or not entry 760D stores a memory address or a null value. If ISR 720B determines a memory address stored in entry 760D, ISR 720B may enable processor 310 to execute one or more program instructions starting at the address in memory stored in entry 760D, as discussed further below.

If entry 760D stores a null value, ISR 720B may not execute program instructions associated with the operating system of device 190. For example, the host computer system may request a version of the firmware. The request may generate an interrupt associated with interrupt index number four. As described above, ISR 720B may be executed in response to the request and/or generated interrupt. If ISR 720B determines a null value stored in entry 760D, a default value for the version may be determined by ISR 720B. Device 190 may respond to the host computer system with the default value. As described above, the firmware version may include a format of "[Major Revision].[Minor Revision].[Bug Fix Revision].[Build Number Revision]". The default version may be "00.00.00.0000", for example. This may allow device 190 to be operable to communicate with the host computer system before the operating system of device 190 is copied from first memory to second memory or executed.

At 640, the operating system may be copied from first to the second memory, as discussed above. The operating system may include a format (e.g., a byte-ordering format or signature format) which allows one or more portions of the operating system to be addressed as data portions and/or subroutine portions. For instance, each subroutine may be considered an operating system service routine (OSR).

At 650, each starting address in memory of an OSR may be stored in OS jump table 750. In one example, after the operating system is copied into the second memory, one or more subroutines of the operating system may be placed at specific addresses in the second memory. In a second example, a format of the operating system may be used to determine one or more memory addresses of one or more subroutines and initialize OS jump table 750. As shown in FIG. 13, for instance, entries 760A and 760D of OS jump table 750 may be initialized to store addresses of operating system service routines (OSRs) 770A and 770B, respectively. Entries 760B-760C of OS jump table 750 may store null values, the use of which is described below.

In various embodiments, OS jump table 750 may be initialized with addresses in memory of one or more OSRs, and device 190 may capable of further device functionality by executing these OSRs. For example, as discussed above, the host computer system may request a version number of the firmware. The request may generate an interrupt associated with ISR 720B, and ISR 720B may be executed in response to the request and generated interrupt. If ISR 720B determines an address in memory stored in entry 760D, ISR 720B may enable processor 310 to execute one or more program instructions starting at the address in memory stored in entry 760D. These program instructions may be associated with the operating system and may be considered OSR 770B. For instance, OSR 770B may determine a version of the firmware. For example, OSR 770B may determine the version of the firmware to be "02.07.01.0003". OSR 770B may determine an error with the operating system, and OSR 770B may determine the version of the firmware to be "FF.FF.FF.FFFF". The determined version of the firmware may be returned to the host computer system.

As discussed above, the host computer system may request information regarding a type of device or instrument that may be coupled to device 190. For example, the request may generate an interrupt associated with ISR 720A, and ISR 720A may be executed in response to the request and generated interrupt. ISR 720A may determine an address in memory stored in entry 760A and may enable processor 310 to execute one or more program instructions starting at the address in memory stored in entry 760A. These program instructions may be associated with the operating system and may be considered OSR 770A.

For instance, OSR 770A may determine a type of device or instrument that may be coupled to device 190. OSR 770A may determine result information for the device or instrument that may be coupled to device 190, and/or OSR 770A may return the result information to the host computer system. The result information may indicate a PXI instrument, a VXI instrument, a GPIB instrument, signal conditioning circuitry, a video device or camera, a motion control device, a distributed data acquisition system, a serial instrument, a PLC, or a fieldbus device, among other types of devices. In some cases, OSR 770A may determine an error and return a result indicating the error.

It should be noted that the above ISRs, OSRs, memory addresses, particular operations performed, etc., are meant to be exemplary only, and are not intended to limit the invention to any particular organization or functionality. Rather, the above examples and others described herein are intended to simply illustrate exemplary techniques and example operations, according to various embodiments.

Figure 8:
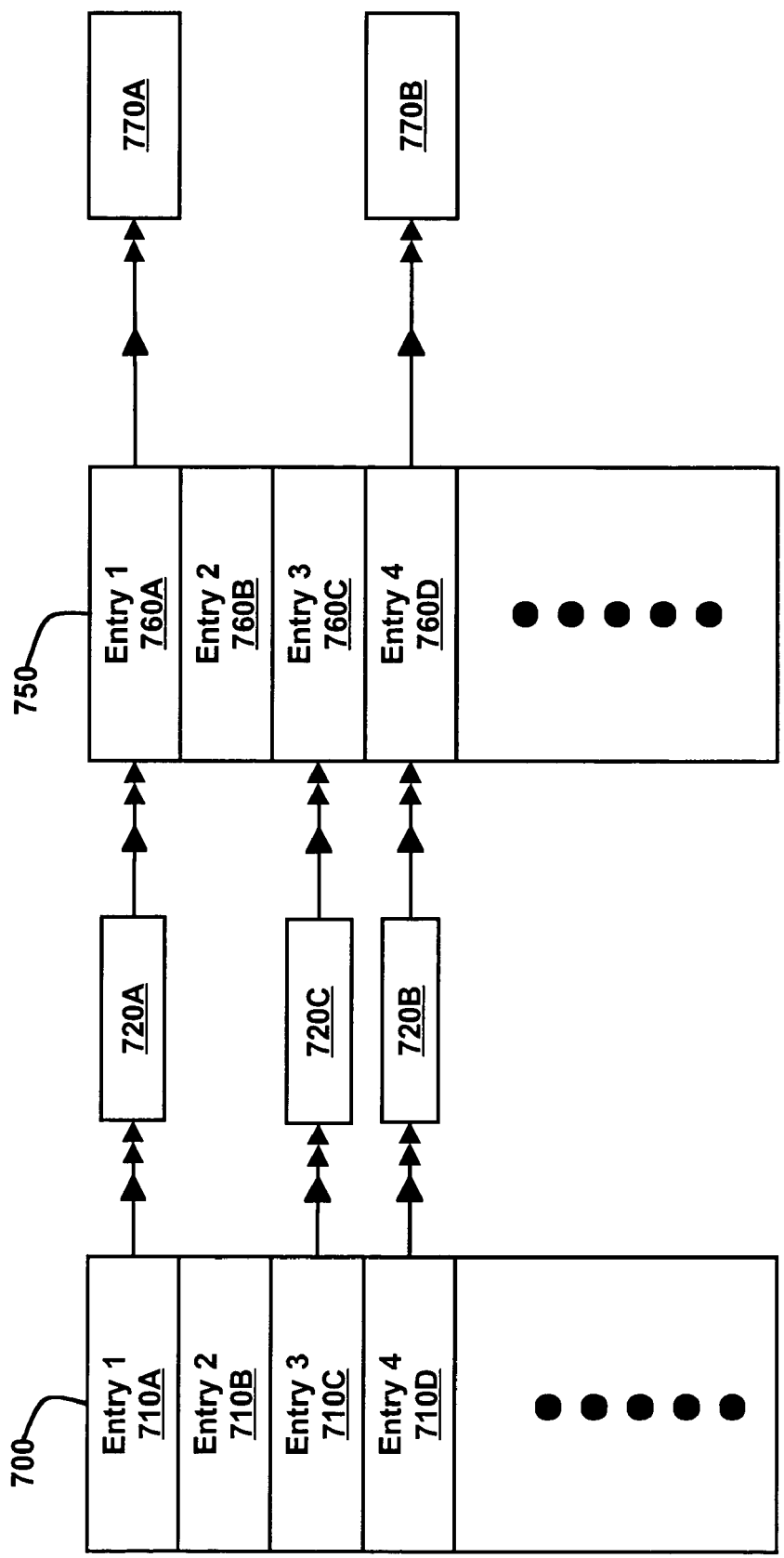
FIG. 8 is a block diagram representing a plurality of data structures and subroutines stored in a memory, according to various embodiments.

FIG. 8—Setup Overview

FIG. 8 illustrates an exemplary block diagram of a memory configuration of device 190, according to some embodiments. It is noted that the examples provided in FIG. 8 are meant to be exemplary only and are not meant to limit any embodiments to any particular content(s) or format(s).

In the embodiment shown, entries 710A, 710C, and 710D may store addresses in memory of interrupt service routines (ISRs) 720A, 720C, and 720B, respectively, while entry 710B may store a null value. As described above, each ISR 720 may include program instructions operable to access OS jump table 750 and may determine whether or not an entry 760 stores a memory address or a null value. For example, entries 760A and 760D may store addresses of OSRs 770A and 770B, respectively, and entries 760B-760C may store null values.

ISRs 720A, 720C, and 720D may be executed in response to generated interrupts associated with interrupt index values one, three, and four, respectively. ISRs 720A and 720D may access entries 760A and 760D, respectively, and ISRs 720A and 720D may determine addresses in memory for OSRs 770A and 770B, respectively. Further, ISRs 720A and 720D may allow and/or enable processor 310 to execute OSRs 770A and 770B, respectively.

In one embodiment, ISR 720C may access entry 760C, and ISR 720C may determine that entry 760C stores a null value. In response to this determination, ISR 720C may not execute program instructions associated with the operating system. In another embodiment, ISR 720C may execute program instructions that may update the operating system portion of the firmware. msw?: what is the connection between these last two sentences? That a null value indicates that an upgrade should be performed?

Figure 9A:
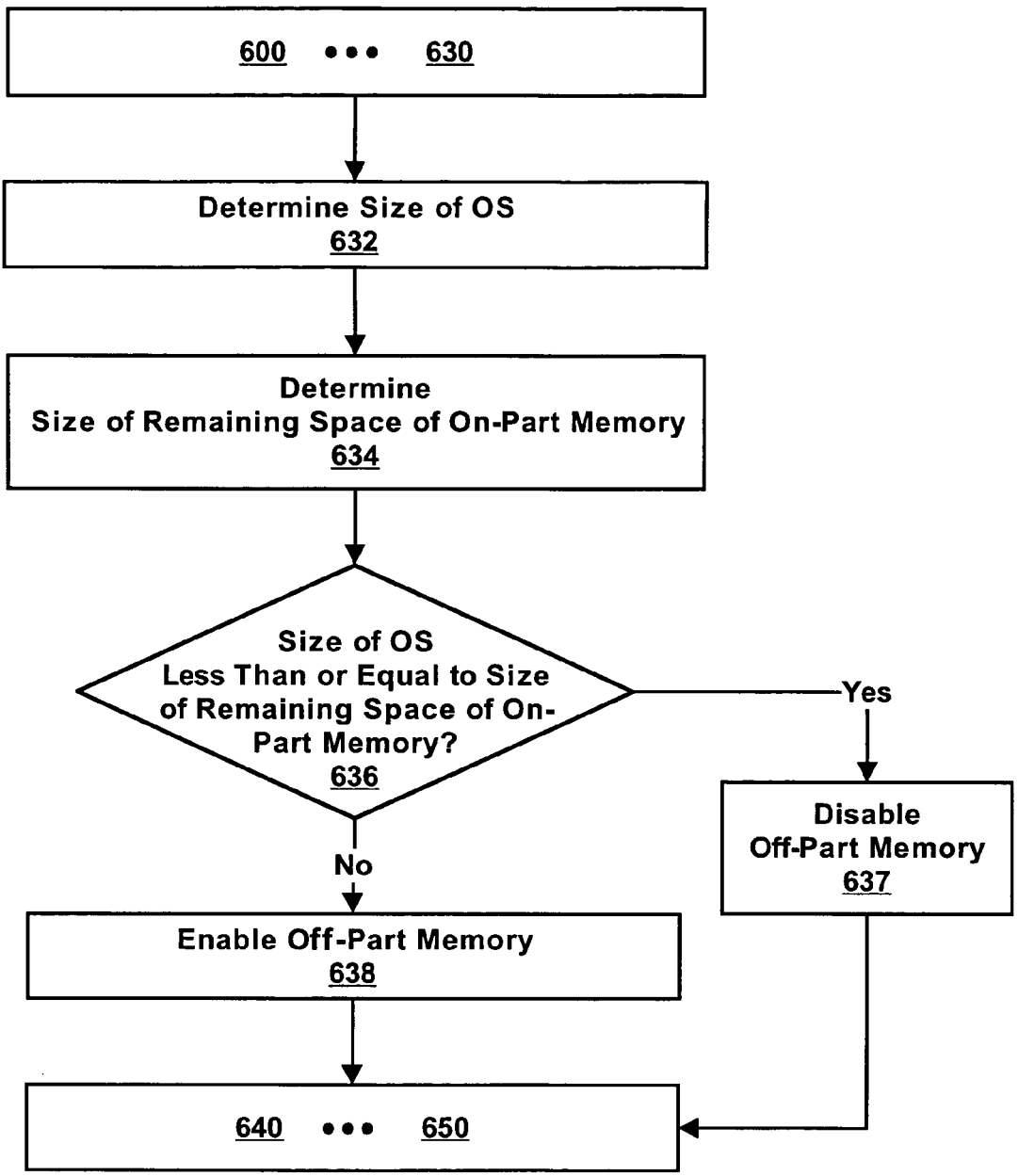
FIG. 9A is a flowchart diagram illustrating a method which may be used to operate off-part memory of a device, according to various embodiments.
Figure 9B:
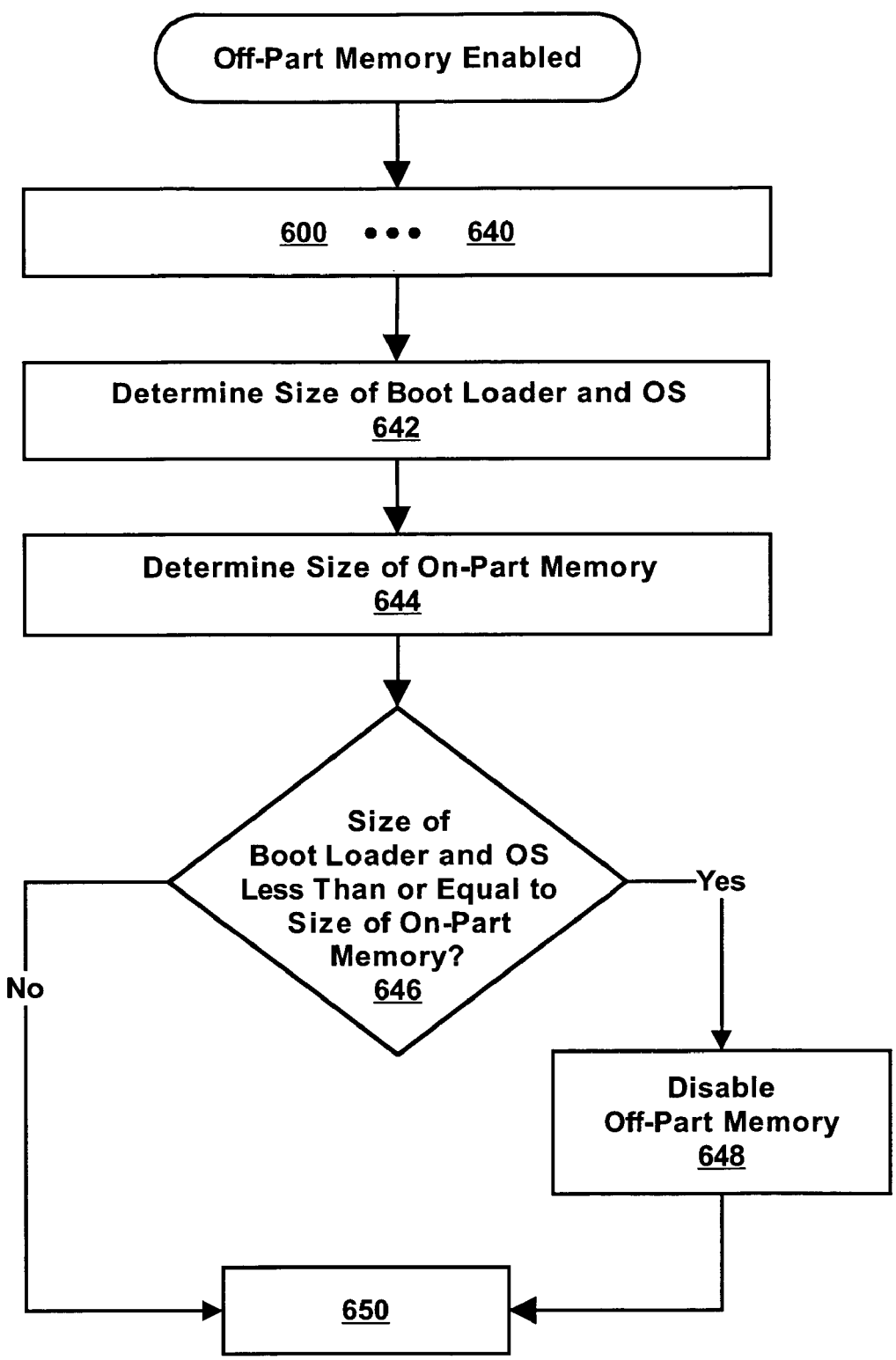
FIG. 9B is a flowchart diagram illustrating a method which may be used to operate off-part memory of a device, according to various embodiments.

FIGS. 9A and 9B—Operating Off-Part Memory

FIGS. 9A-9B are flowchart diagrams of methods for operating off-part memory of device 190, according to various embodiments. It is noted that in various embodiments one or more of the method elements may be performed concurrently, in a different order, or may be omitted. For example, elements 642-649 of FIG. 9A may be omitted in some embodiments, and/or elements 632-638 of FIG. 9B may be omitted in some embodiments. Additional elements may be performed as desired. Note that the methods of FIGS. 9A and 9B are described in the context of the method of FIG. 5, and that the descriptions below refer to some of the method elements thereof.

In some embodiments, device 190 may be configured such that off-part memory 340 may be enabled or disabled by one or more program instructions. When off-part memory 340 is disabled, it may not be accessible by program instructions and/or it may not be used to store and/or retrieve program instructions and/or data. When off-part memory 340 is enabled, it may form a portion of the second memory of device 190, and the second memory of device 190 may include on-part memory 330 and off-part memory 340.

In some embodiments, device 190 may be configured such that memory addresses of the second memory are contiguous (e.g., may appear to be "seamless") across on-part memory 330 and off-part memory 340. For example, the second memory may include a memory address range of $0000_{hex}$ to $5FFF_{hex}$ and may store program instructions and/or data which are addressable in the range $0000_{hex}$ to $5FFF_{hex}$. For instance, the memory addresses of on-part memory 330 may include a range of $0000_{hex}$ to $1FFF_{hex}$, and the memory addresses of off-part memory 340 may include a range of $2000_{hex}$ to $5FFF_{hex}$. It is noted that these particular memory addresses and ranges are exemplary only.

As shown in FIG. 9A, after 600-630 of the method of FIG. 5, the boot loader portion of firmware (e.g., stored in and executing from on-part memory 330) may determine a size of an OS portion of the firmware, as indicated at 632. At 634, the boot loader may determine a size of remaining space of on-part memory 330. The boot loader may determine if the size of the OS is less than or equal to the size of the remaining space of on-part memory 330, as indicated at 636. If the size of the OS is less than or equal to the size of the remaining space of on-part memory 330, the boot loader may disable off-part memory 340, at 637. The boot loader may copy the OS from the first memory (e.g., non-volatile memory 320) to the second memory (e.g., on-part memory 330 and not including off-part memory 340), as indicated at 640.

If the size of the OS is not less than or equal to the size of the remaining space of on-part memory 330, the boot loader may enable off-part memory 340, as indicated at 638. As discussed above, in various embodiments, when off-part memory 340 is enabled, the second memory may include on-part memory 330 and off-part memory 340. When off-part memory 340 is enabled and included in the volatile memory, the boot loader may copy the OS from the first memory (e.g., non-volatile memory 320) to the second memory (e.g., including on-part memory 330 and off-part memory 340). In some embodiments, when the second memory includes on-part memory 330 and off-part memory 340, a first portion of the OS may be stored on on-part memory 330, and a second portion of the OS may be stored on off-part memory 340. In various embodiments, when the second memory includes on-part memory 330 and off-part memory 340, on-part memory 330 may not store a portion of the OS, and off-part memory 340 may store the OS.

As shown in FIG. 9A, off-part memory 340 may be enabled, and, further, the second memory may include on-part memory 330 and off-part memory 340. In various embodiments, if off-part memory 340 is not used by firmware of device 190, off-part memory 340 may be disabled. For example, disabling off-part memory 340 (if not used) may reduce power consumption and/or heat production of device 190.

As shown in FIG. 9B, off-part memory 340 may be enabled and after 600-640 (of FIG. 5), a size of the boot loader and a size of the OS may be determined, at 642, and a size of on-part memory 330 may be determined, as indicated at 644. It may be determined if the size of the boot loader and the OS is less than or equal to the size of on-part memory 330, as indicated at 646. If the size of the boot loader and the OS is not less than or equal to the size of on-part memory 330, the method may proceed to 650. If the size of the boot loader and the OS is less than or equal to the size of on-part memory 330, off-part memory 340 may be disabled, as indicated at 648. If off-part memory 340 is disabled, the second memory may include on-part memory 330 and not off-part memory 340. It is noted that in various embodiments, program instructions of the boot loader and/or the OS may perform one or more of the method elements 642-648.

Figure 10:
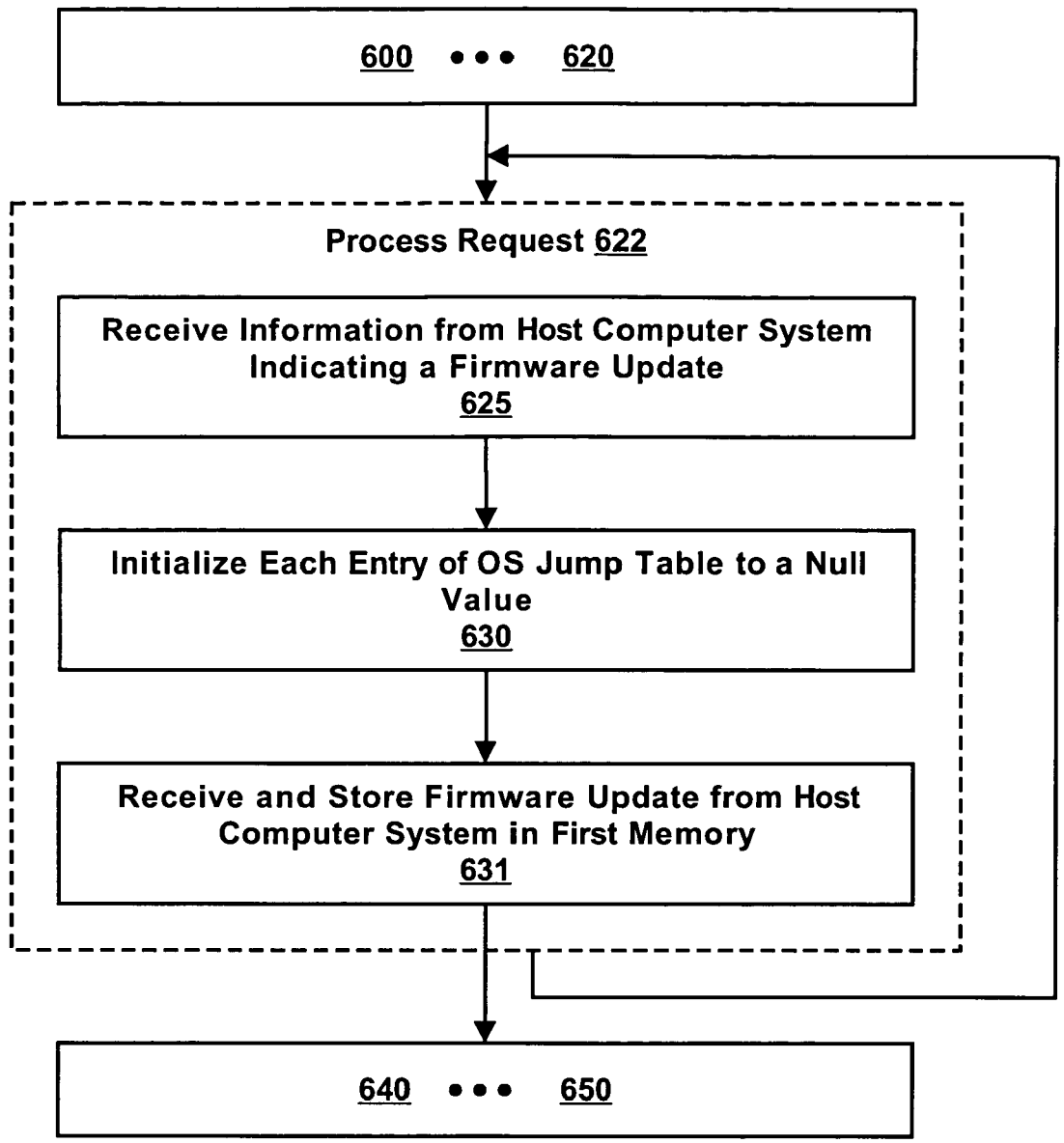
FIG. 10 is a flowchart diagram illustrating a method which may be used to operate a device, according to various embodiments.

FIG. 10—Firmware Update

FIG. 10 is a flowchart diagram of a method for updating firmware or a portion of firmware of device 190, according to various embodiments. It is noted that in various embodiments one or more of the method elements may be performed concurrently, in a different order, or may be omitted. Additional elements may be performed as desired. Note that the method of FIG. 10 is described in the context of the method of FIG. 5, and that the description below refers to some of the method elements thereof.

As shown in FIG. 10, device 190 may process a request at 622. Device 190 may receive information from host computer system indicating that firmware may be updated, at 625. In some embodiments, only a portion of firmware may be updated, such as an operating system portion of firmware. In response to the received information, the OS jump table may be initialized, as indicated at 630. Following the example embodiment of FIGS. 6 and 7, OS jump table 750 may initialized such that entries 760A-760D each stores a null value. In situations where an operating system currently stored in device 190 may not be desired, storing a null value for each entry 760A-760D may prevent one or more portions of the current operating system from being accessed or executed. Thus, null values may be used to prevent use of invalid and/or out-of-date instructions.

At 631, device 190 may receive a firmware update from the host computer system and store the firmware update in first memory (e.g., non-volatile storage 320). In some embodiments, the firmware update may include updating an operating system and not a boot loader for device 190. After 631, the method may proceed to 640 and may continue as described above with reference to FIG. 5.

Figure 11:
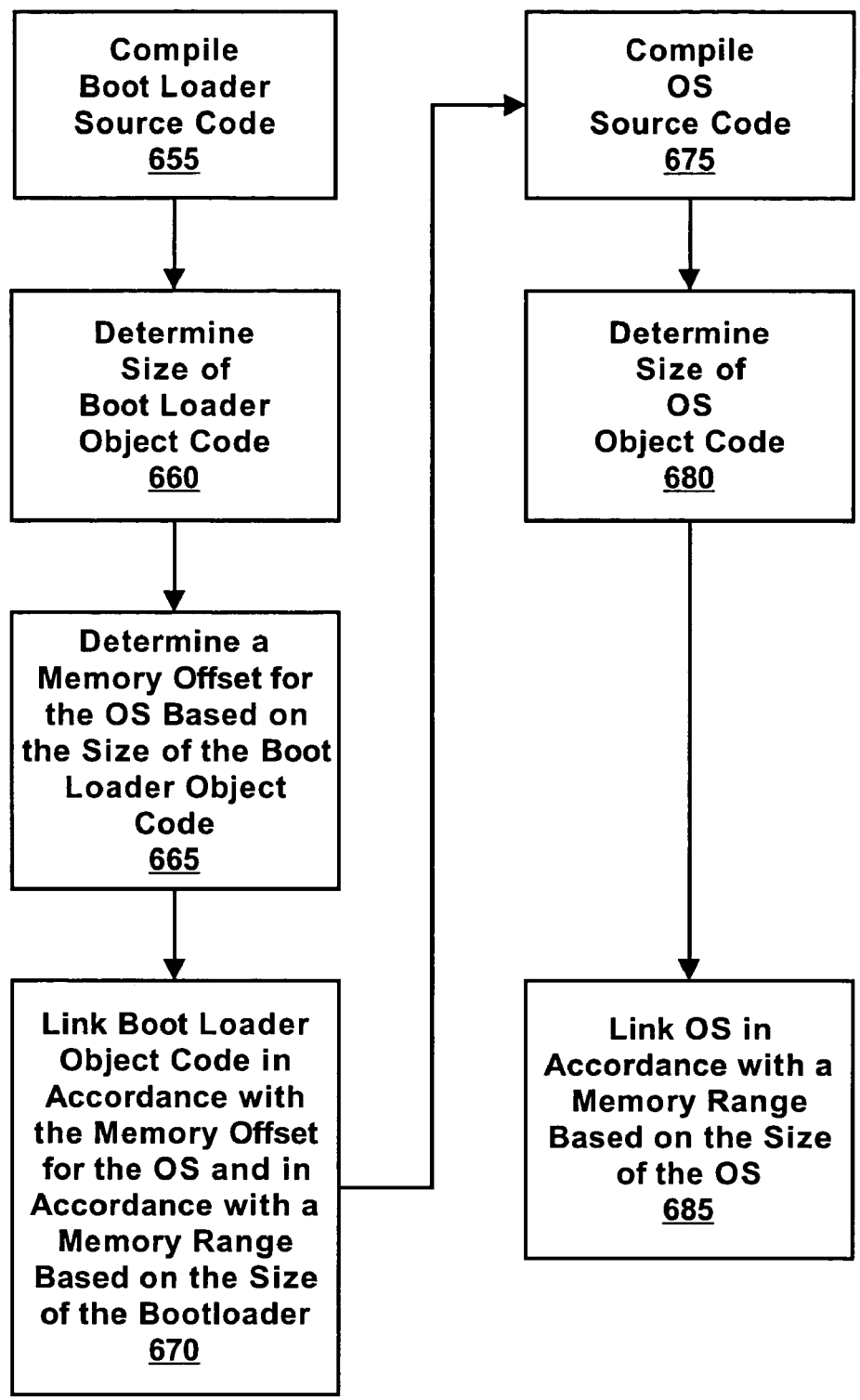
FIG. 11 is a flowchart diagram illustrating a method which may be used to build firmware for a device, according to various embodiments.

FIG. 11—Building Firmware

FIG. 11 is a flowchart diagram of a method for building or constructing a boot loader and/or an OS portion of firmware, according to various embodiments. It is noted that in various embodiments one or more of the method elements may be performed concurrently, in a different order, or may be omitted. Additional elements may be performed as desired.

In various embodiments, the boot loader and/or the OS may be software programs that are produced from source code (e.g., one or more source files). For instance, the source code may include instructions of one or more text-based languages such as C, C++, Pascal, Fortran, Cobol, Java, among others. In some embodiments, the source code may include graphical code, such as from a graphical programming language, such as the "G" graphical programming language used in the LabVIEW graphical programming system provided by National Instruments Corporation.

In some embodiments, "compiling" source code into machine code (e.g., byte-code, machine instructions, rudimentary instructions for a processor or CPU, etc.) may include a compile step and a link step. The compile step may transform source code into object code. In various embodiments, the object code may include machine code, relative memory addresses, and/or symbolic memory addresses. The object code may be considered an object module.

The link step may combine one or more object modules, transform symbolic memory addresses into non-symbolic memory addresses (e.g., real or physical memory addresses), and/or transform relative memory addresses into real or physical memory addresses. Transforming symbolic memory addresses and/or relative memory addresses into real or physical memory addresses may include using information from a memory map. For example, the memory map may include one or more ranges of real or physical memory addresses of a target embedded device, such as device 190, and/or a computer system. The memory map may include one or more layouts and/or ranges of real or physical memory addresses that may be used by a software program, such as the boot loader and/or the OS. The memory map may include a starting address (e.g., real or physical memory address) of one or more software programs. For instance, the memory map may include a starting address of the boot loader and/or the OS.

As indicated at 655, the boot loader may be compiled, thereby producing boot loader object code. At 660, a size of the boot loader object code may be determined. Based on the size of the boot loader object code, a memory address offset for the OS may be determined, as indicated at 665. In some embodiments, the memory address offset for the OS may be a relative offset and/or a symbolic memory address. At 670, a linker (e.g., a software program for transforming object code into code executable by a processor or CPU) may process the boot loader object code, thereby generating a boot loader executable by device 190. The link step may map the physical memory of device 190 to the boot loader. In some embodiments, mapping the physical memory of device 190 may include using a memory address range, based on the size of the boot loader object code, and the memory address offset for the OS and/or the symbolic memory address for the OS.

The OS source code may be complied, as indicated at 675, thereby producing OS object code. A size of the OS object code may be determined, at 680. At 685, a linker may process the OS object code, thereby generating the OS executable by device 190. The link step may include using a memory address range, based on the size of the OS object code, to map the physical memory of device 190 to the OS.

The various embodiments described herein may provide numerous benefits. For example, in a firmware update process, a first portion of firmware (e.g., a boot loader), which provides basic functions of device 190, may not be updated. Thus, only updating a second portion (e.g., an operating system) of firmware may allow device 190 to operate more robustly. As described above, the device 190 may become uncoupled from the host computer system or lose power during a firmware update. When device 190 is re-coupled to the host computer system or re-gains power, device 190 may be operable to update a second portion of the firmware (e.g., the OS for the device), since the first portion of the firmware was not modified. In various embodiments, by not updating the first portion of the firmware or boot loader and only updating the second portion of the firmware or operating system portion of the firmware, the systems and/or methods described herein may allow device 190 to be more robust, cost-effective, and/or user-friendly. Another benefit may be the obviation of re-enumeration of the device after a (partial) firmware update. Yet another benefit may be the ability of the device, via the boot loader, to process requests during the update process.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed:

1. A method for operating a device, wherein the device comprises a boot loader, the method comprising:

the boot loader transferring an operating system from a first memory medium of the device to a second memory medium of the device, wherein the first memory medium comprises non-volatile memory;

the boot loader configuring the second memory medium to allow a processor of the device to execute at least a portion of the operating system, wherein said at least a portion of the operating system is executable from the second memory medium by the processor to operate the device; and the boot loader processing one or more requests from a host computer system concurrently with one or more of:

said transferring the operating system from the first memory medium to the second memory medium;

said configuring the second memory medium to allow the processor of the device to execute at least a portion of the operating system; or executing said at least a portion of the operating system from the second memory medium to operate the device.

2. The method of claim 1, wherein the boot loader is stored in the first memory medium and executable by the processor from the first memory medium.

3. The method of claim 1, wherein the boot loader is stored in the second memory medium and executable by the processor from the second memory medium.

4. The method of claim 1, wherein said executing said at least a portion of the operating system from the second memory medium is performed concurrently with said boot loader processing the one or more requests from the host computer system.

5. The method of claim 1, further comprising:

associating the device with the host computer system.

6. The method of claim 5, wherein said associating the device with the host computer system is performed concurrently with one or more of:

said boot loader processing the one or more requests from the host computer system;

said transferring the operating system from the first memory medium to the second memory medium;

said configuring the second memory medium to allow the processor of the device to execute at least a portion of the operating system; or said executing said at least a portion of the operating system from the second memory medium to operate the device.

7. The method of claim 5, wherein said associating the device with the host computer system includes enumerating the device.

8. The method of claim 1, further comprising:

acquiring a different operating system from the host computer system, wherein said acquiring the different operating system includes storing the different operating system in the first memory medium; and transferring the different operating system from the first memory medium to the second memory medium.

9. The method of claim 8, wherein at least one of said acquiring the different operating system and said transferring the different operating system is performed concurrently with said boot loader processing the one or more requests from the host computer system.

10. The method of claim 8, further comprising:

configuring the second memory medium to allow the processor of the device to execute at least a portion of the different operating system.

11. The method of claim 8,
wherein said acquiring the different operating system includes replacing at least a portion of the operating system with the different operating system.

12. The method of claim 1,
wherein the device is coupled to the host computer system through a bus.

13. The method of claim 12,
wherein the bus comprises a Universal Serial Bus (USB).

14. The method of claim 12,
wherein the bus comprises an IEEE 1394 bus.

15. The method of claim 1,
wherein the device is coupled to the host computer system through an Ethernet connection.

16. The method of claim 1,
wherein the one or more requests includes a request for a version of the operating system.

17. The method of claim 1,
wherein the one or more requests includes a request for a status.

18. The method of claim 1,
wherein the device is an embedded device.

19. A device, comprising:
a processor;
a first memory medium coupled to the processor, wherein the first memory comprises non-volatile memory, and wherein the first memory medium stores a boot loader and an operating system; and
a second memory medium coupled to the processor;
wherein the boot loader is executable by the processor to:
  transfer the operating system from the first memory medium to the second memory medium; and
  configure the second memory medium to allow the processor to execute at least a portion of the operating system, wherein said at least a portion of the operating system is executable from the second memory medium by the processor to operate the device;
wherein the boot loader is further executable by the processor to process one or more requests from a host computer system concurrently with one or more of:
  said transferring the operating system from the first memory medium to the second memory medium;
  said configuring the second memory medium to allow the processor of the device to execute said at least a portion of the operating system; or
  the processor executing said at least a portion of the operating system.

20. The device of claim 19,
wherein the boot loader is executable by the processor from the first memory medium.

21. The device of claim 19,
wherein the boot loader is executable by the processor from the second memory medium.

22. The device of claim 19,
wherein the device is operable to transfer the boot loader from the first memory medium to the second memory medium; and
wherein the boot loader is executable by the processor from the second memory medium.

23. The device of claim 19, wherein the boot loader is further executable by the processor to:
associate the device with the host computer system.

24. The device of claim 23, wherein the boot loader is further executable by the processor to perform said associating the device with the host computer system concurrently with one or more of:
said processing the one or more requests from the host computer;
said transferring the operating system from the first memory medium to the second memory medium;
said configuring the second memory medium to allow the processor of the device to execute said at least a portion of the operating system; or
the processor executing said at least a portion of the operating system from the second memory medium to operate the device.

25. The device of claim 23,
wherein, in said associating the device with the host computer system, the boot loader is further executable by the processor to enumerate the device.

26. The device of claim 19, wherein the boot loader is further executable by the processor to:
acquire a different operating system from the host computer system, wherein acquiring the different operating system includes storing the different operating system in the first memory medium.

27. The device of claim 26, wherein the boot loader is further executable by the processor to perform said acquiring the different operating system from the host computer system concurrently with one or more of:
said processing the one or more requests from the host computer;
said transferring the operating system from the first memory medium to the second memory medium;
said configuring the second memory medium to allow the processor of the device to execute said at least a portion of the operating system; or
the processor executing said at least a portion of the operating system from the second memory medium to operate the device.

28. The device of claim 26,
wherein, in said acquiring the different operating system, the boot loader is further executable by the processor to replace at least a portion of the operating system with the different operating system.

29. The device of claim 26, wherein the boot loader is further executable by the processor to:
configure the second memory medium to allow the processor of the device to execute at least a portion of the different operating system.

30. The device of claim 29, wherein the boot loader is further executable by the processor to perform said configuring the second memory medium to allow the processor of the device to execute said at least a portion of the different operating system concurrently with said processing the one or more requests from the host computer.

31. The device of claim 19,
wherein the device is coupled to the host computer system through a bus.

32. The device of claim 31,
wherein the bus comprises a Universal Serial Bus (USB).

33. The device of claim 31,
wherein the bus comprises an IEEE 1394 bus.

34. The device of claim 19,
wherein the device is coupled to the host computer system through an Ethernet connection.

35. The device of claim 19,
wherein the one or more requests includes a request for a version of the operating system.

36. The device of claim 19,
wherein the one or more requests includes a request for a status.

37. The device of claim 19,
wherein the second memory medium comprises the boot loader;
wherein the second memory medium comprises a first portion of the second memory medium and a second portion of the second memory medium; and
wherein the device is operable to enable or disable the second portion of the second memory medium.

38. The device of claim 37,
wherein the boot loader or the operating system are further executable by the processor to:
determine a size of the boot loader and the operating system;
determine a size of the first portion of the second memory medium;
determine if the size of the boot loader and the operating system is less than or equal to the size of the first portion of the second memory medium; and
if the size of the boot loader and the operating system is less than or equal to the size of the first portion of the second memory medium, disable the second portion of the second memory medium.

39. The device of claim 38,
wherein the processor comprises the first portion of the second memory medium.

40. The device of claim 37,
wherein the boot loader is further executable by the processor to:
determine a size of the operating system;
determine a size of available space of the first portion of the second memory medium;
determine if the size of the operating system is less than or equal to the size of available space of the first portion of the second memory medium;
if the size of the operating system is less than or equal to the size of available space of the first portion of the second memory medium, transfer the operating system to the first portion of the second memory medium; and
if the size of the operating system is not less than or equal to the size of available space of the first portion of the second memory medium, enable the second portion of the second memory medium and transfer the operating system to the second memory medium.

41. The device of claim 40,
wherein the boot loader is further executable by the processor to:
if the size of the operating system is less than or equal to the size of available space of the first portion of the second memory medium, disable the second portion of the second memory medium.

42. The device of claim 40,
wherein the processor comprises the first portion of the second memory medium.

43. The device of claim 19,
wherein the device is an embedded device.

* * * * *